Patented Oct. 9, 1934

1,975,787

UNITED STATES PATENT OFFICE 1,975,787

WATERPROOFED GYPSUM

Waldemar C. Hansen, Westfield, N. J., assignor to American Cyanamid Company, New York, N. Y., a corporation of Maine No Drawing. Application February 20, 1931, Serial No. 517,309

8 Claims. (Cl. 106—34)

The present invention relates to a method of waterproofing gypsum products and to the product resulting from such treatment.

The hydration of calcium sulphate hemihydrate requires roughly 19% of water. Such an amount of water is not sufficient, however, to form a plastic mass of such a consistency that it is suitable for plastering and/or molding. Therefore, calcined gypsum is usually mixed with two or more times the water required for the reaction. This water evaporates when the set product is allowed to dry. Set gypsum is a mass of interlacing fine crystals, and as the excess water evaporates from such a mass of crystals, it leaves a series of pores or channels in the product. As a result, the dried set product takes up water very rapidly when immersed therein.

Since the strength attained by gypsum products is due to the interlacing of the fine crystals, it is essential that this crystallization be not disturbed to any great extent. Experience has shown that gypsum is very sensitive to foreign materials for they tend to influence the rate of crystallization thereof. Therefore, in attempting to waterproof a gypsum product, it is essential to choose a material which will not interfere seriously with the crystallization process, but which will at the same time have the property of decreasing the porosity of the product.

Gypsum products, when dry, take up water very rapidly when wetted. This taking up of water weakens the product by reason of the fact that the water entering the mass has an opportunity to dissolve gypsum from the interior. While this solvent or corroding action may similarly take place at the surface of the product, yet the interior corrosion will cause a weakness of the structure long before it would fail if all of this action took place at the surface.

The principal object of the invention, therefore, is to provide a cheap material which can be incorporated into the gypsum product during its manufacture without disturbing to any marked extent the setting of the gypsum or the strength of the gypsum product, and which will cause the product to resist water penetration to a much greater extent than untreated gypsum products. It is understood, of course, that while the treatment of this invention will not eliminate entirely corrosion by water of the surface of the product, yet it will eliminate to a marked degree the corrosion by water of the interior of the specimen by decreasing the amount of water which may enter or be absorbed thereby.

The art of adding materials to Portland cement concrete as integral waterproofing agents have been practiced for many years. Most of the materials which have been used with more or less success in concrete have not proved of any great value with gypsum. This is undoubtedly due to the inherent chemical and physical differences between a set product of gypsum and one of concrete.

I have discovered that the metallic resinates are particularly efficacious in integrally waterproofing set gypsum products and prevent to a marked degree the penetration of water into the mass. These resinates may be incorporated in the plastic mix in any stage of its preparation, and, as a matter of fact, may be mixed with the dry calcined gypsum and handled as a distinct article of manufacture without disintegration, caking, or taking on any undesirable characteristics, being handled in exactly the same manner as calcined gypsum alone. I have found that one form of desirable resinate may be produced by the reaction of metallic oxides or hydroxides with a resin and the invention, therefore, contemplates the use of any metallic oxide or hydroxide or any resin which may be caused to react and produce a metallic resinate.

As a preferred form of the invention, I have found that the product resulting from the reaction of lime and rosin forms a material which has real value in increasing the resistance of gypsum products to water penetration.

This material may be prepared by stirring calcium oxide or hydroxide with molten rosin until the oxide has reacted. The melt is then allowed to solidify, ground to a dry powder and mixed with dry, calcined gypsum, the mass gauged with water and permitted to set. It can, of course, be mixed with the gauging water or with the gypsum water paste.

The product resulting from the reaction of molten rosin and lime may be termed either "limed rosin", or "calcium resinate", depending upon the quantity of lime used. A sample of commercial calcium resinate was found to be a good material, as well as a number of preparations made by reacting various proportions of lime and rosin.

Experiments have been conducted in which from one to twenty per cent of lime were reacted with from ninety-nine to eighty per cent of rosin. All of these products were found to be of value for the purpose described, but the 5% calcium oxide—95% rosin preparation appeared to have more waterproofing power than did the lower lime composition, and as much as the higher lime composition. Five per cent by weight of the 5% lime-rosin product added to calcined gypsum appeared to give maximum resistance to water penetration in a set product.

For example, a plain specimen, i. e., one prepared from neat calcined gypsum absorbed twenty-five per cent of its weight of water in one minute, whereas a specimen prepared of calcined gypsum and water with five per cent by weight of the 5% calcium resinate absorbed only three per cent of its weight of water in ten minutes. The treated specimen required forty-eight hours immersion under water to absorb fifteen per cent of its weight of water.

The rosin referred to in the above example is the ordinary rosin of commerce or colophony resin. As a matter of fact, experiments have demonstrated that any resin which will react with a metallic oxide to give a resinate is suitable for the purpose under consideration.

The oxides of sodium, zinc and magnesium when reacted with rosin in place of lime gave waterproofing characteristics to a plastic mix containing gypsum. This seems to indicate that any metallic oxide which will react with a resin will be suitable for this purpose, although from the standpoint of economy and cheapness it is probably desirable to use calcium resinate or the product of the reaction between lime and rosin.

Many advantageous uses may be made of gypsum products so waterproofed, such as gypsum blocks which are used in buildings where steam or moisture condenses thereon, having the effect of rapidly corroding such blocks either on the surface or in the interior thereof. In gypsum plastering to be used on the outside of buildings which are exposed to the weather, incorporation therein of a metallic resinate will increase its resistance to this corroding action. Again, the gypsum resinate mixture may be used as a gypsum mortar where such mortar is used to bond together gypsum blocks. In fact, this mixture may be used in any place where a gypsum composition is desirable, and which is subjected to the corroding and/or solvent action of moisture.

While the invention has been described with particular reference to a set product, a dry mixture, and a method of preparation of waterproofing gypsum, yet, obviously, the invention is not to be limited strictly thereto, but is to be construed broadly and limited only by the scope of the claims.

I claim:

1. A process of producing a waterproof gypsum product of desirable strength, setting time, and crystal structure which comprises uniformly incorporating 1-10% by weight of a solid, water insoluble resinate with calcined gypsum, gaging with water and setting in the usual manner.

2. A process of producing a waterproof gypsum product of desirable strength, setting time and crystal structure which comprises uniformly incorporating 1-10% by weight of solid calcium resinate with calcined gypsum, gaging with water and setting in the usual manner.

3. A process of producing a waterproof gypsum product of desirable strength, setting time and crystal structure which comprises uniformly incorporating 1-10% of the dry reaction product of molten colophony and calcium oxide with calcined gypsum, gaging with water and setting in the usual manner.

4. A process of producing a waterproof gypsum product of desirable strength, setting time and crystal structure which comprises uniformly incorporating substantially 5% of the dry reaction product of molten colophony and 5% of its weight of calcium oxide with calcined gypsum, gaging with water and setting in the usual manner.

5. As a new product, a set mass of waterproof gypsum of desirable strength and crystal structure, characterized by a content of 1-10% by weight of a solid, water insoluble resinate and prepared substantially in accordance with the process of claim 1.

6. As a new product, a set mass of waterproof gypsum of desirable strength and crystal structure, characterized by a uniformly distributed content of 1-10% of calcium resinate.

7. As a new product, a set mass of waterproof gypsum of desirable strength and crystal structure, characterized by a uniformly distributed content of 1-10% of the dry reaction product of molten colophony and calcium oxide.

8. As a new product dry, calcined gypsum containing 1-10% of dried, powdered calcium resinate.

WALDEMAR C. HANSEN.